Aug. 25, 1959 J. R. HARBOTTLE 2,901,093
RESILIENT CONVEYOR ROLLERS
Filed Sept. 21, 1954

United States Patent Office 2,901,093
Patented Aug. 25, 1959

2,901,093

RESILIENT CONVEYOR ROLLERS

John Russell Harbottle, Claremont, Cape Town, Union of South Africa, assignor to Jonas Woodhead & Sons Limited, Leeds, England, a British company Application September 21, 1954, Serial No. 457,376

Claims priority, application Union of South Africa February 6, 1954

2 Claims. (Cl. 198—192)

This invention relates to belt or band conveyors of the type in which the belt or band is supported by rollers comprising a helical spring.

Customarily, the spring is provided at its ends with spindles which are suspended and rotatably mounted in bearings made so as to permit a limited amount of angular or universal movement of the spindles so that the spring roller is not only free to rotate, but also to sag under its own weight and according to the weight of the belt or band and the load carried thereby.

Hitherto, the spindles have been formed integral with, or had rigidly affixed thereto, either end plates or collars to which the end convolutions of the spring are attached, or helically-grooved or other hubs which are a firm fit within, and are frictionally gripped by, the end convolutions of the spring.

The formation of the end plates, collars or hubs integral or rigid with the spindles is satisfactory, provided that the springs of the different rollers are of the same strength or resistance to sagging. In practice, however, the different springs, under normal modes of manufacture, are almost invariably different from one another in respect of their resistance to sagging. This lack of uniformity inevitably leads to unequal loading and wear and tear as amongst the different rollers, as well as want of smoothness in the surface of the belt or band as supported thereon.

When, also, the rollers have been mounted in their bearings, and the band is given a test run on the rollers, it sometimes transpires that the rollers, or some of them, are not in precise medial or symmetrical position laterally with respect to the axis or line of travel of the band. Such incorrect positioning may also cause want of smoothness in the supported surface of the band and/or undue wear and tear on one side of a roller and its bearing as compared with the other side.

The object of the present invention is to provide an improvement in belt or band conveyors of the type stated whereby the aforesaid defects due to non-uniformity in resistance to sagging as amongst the different rollers can be compensated for or reduced, and whereby also the aforesaid defects due to the rollers not being medially or symmetrically positioned with respect to the belt or band can be obviated or minimised.

According to the invention, there is provided a spring roller for a belt or band conveyor of the type stated in which the end plates, collars, hubs or like members to which the end convolutions of the springs are attached, or on to which the end convolutions are fitted or screwed, are mounted on their respective spindles so as to be capable of being adjusted to, and held for operation in, different axial positions thereon. For example, the inner portion of each spindle, that is, the portion adjacent to the end plate, collar, hub or like member, may be screw-threaded, and the end plate or like member may be penetrated, or formed inwardly from its outer end, with an axial screw-threaded hole or recess, into which the inner screw-threaded portion of the spindle may be screwed, and from which it may be unscrewed, more or less, at will, the said screw-threaded portion of the spindle being provided with a nut and a spring washer or other locking means for holding the spindlde in the end plate or like member in the position to which it is adjusted.

With this means, the end plates, hubs or like members, with the ends of the spring secured or fitted thereto, can be shifted in position outwardly towards the points of suspension of the spindles in order to extend the spring and reduce the sag or curvature of the spring whilst also increasing its resistance to sagging. For example, along the successive rollers for the upper or loaded stretch of a belt or band (or the rollers for the lower or return stretch), the sag (and the resistance to sagging) of the several rollers can be equalised by extending the weaker springs to such various individual degrees as may be necessary to render their sag (and resistance to sagging) uniformly equal, or substantially equal, to that of the strongest spring. In practice, when the spring rollers have been mounted in their bearings, a templet may be made conforming to the catenary curvature or sag of the strongest roller, and may be used to determine the position to which the curvature or sag of each of the other rollers must be brought in order to ensure uniformity of the curvature or sag throughout the whole of the rollers of the given upper (or lower) stretch of the belt or band.

By virtue also of the same screw-threaded adjustment and locking means, the end plates, hubs or like members at both ends of the roller or rollers can be shifted a given distance or distances in the same lateral direction from left to right, or right to left. In this manner, any of the springs can be centralised or brought into medial or symmetrical position with respect to the belt or band as and whenever incorrect positioning initially exists or subsequently arises.

In order to illustrate the invention, one constructional form of the same will now be described, by way of example, with reference to the accompanying drawing, in which.

Figure 1:
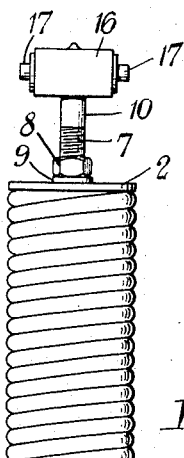
Figure 1 is a view which, as to its left-hand half, is a sectional elevation and, as to its right-hand half, is a plan view, of a spring roller fitted with end plates or hubs, and spindles adjustable relatively thereto, according to the invention.
Figure 3:
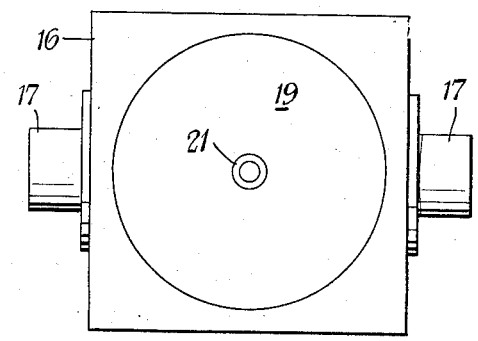
Figure 3 is an end view of the said bearing and hinge-pin casing, looking towards the outer end thereof.
Figure 4:
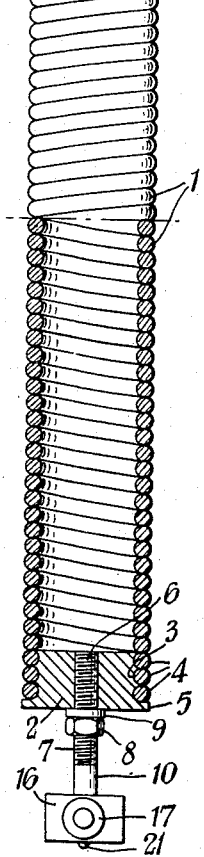
Figure 4 is a side view of the said casing, looking toward one of the hinge-pins.
Figure 4:
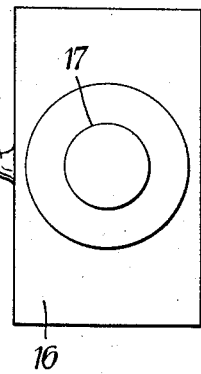

Referring to the drawings:

As shown in Figure 1, the spring roller 1 is provided with end plates or hubs 2. Each of these hubs 2 has its cylindrical surface or periphery 3 helically grooved, and the end convolutions 4 of the spring roller are screwed thereon. The end of the spring abuts against the collar or shoulder 5 of the hub, and a tight friction grip is established between the convolutions 4 and the hub. Axially through each hub 2 there extends a screw-threaded hole 6.

The spindle fitted to each hub comprises a screw-threaded shank 7 which is of greater length than the axial depth of the hole 6, the excess of length of the screw-threaded part 7 being made sufficiently ample to permit such relative positioning or screwing of the spindle inwards and outwards with respect to the hub as will serve to effect the necessary or desirable adjustments of sag, and resistance to sagging, of the spring, and/or of the lateral position of the roller to left or right, as previously referred to.

For the purpose of locking the spindle shank 7 in whatever position it may be adjusted to as aforesaid in the hub 2, a locking nut 8 and spring washer 9 are provided.

Figure 2:
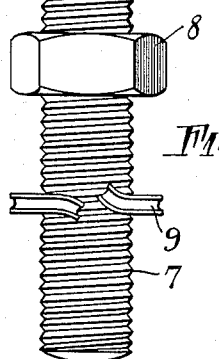
Figure 2 is a relatively enlarged view showing one of the aforesaid spindles, with its bearing and hinge-pin casing shown in sectional plan.

As shown in Figure 2, the outer end 10 of the spindle is formed with an enlarged portion 11, at the end of which is formed a cylindrical head 12. On the portion 11, there is mounted the inner ring 13 of a ball-race 14. On the outer ring 15 of this ball-race, there is mounted a casing 16 which is formed externally, diametrically at opposite sides, with the hinge-pins or trunnions 17, which serve to suspend the spindle 7, 10 hingeably as a whole in end supports or hangers (not shown) provided for that purpose on the conveyor frame.

The casing 16 is formed with an inner or end wall 18, and with a removable outer cover or end disc 19. The interior 20 of the casing 16 is adapted to be filled with grease introduced through a nipple or aperture 21, and the opening 22 in the wall 18 through which the spindle projects is fitted with a grease seal 23.

As will be appreciated, the adjustment of position of the spindle 7, 10 at one end of the spring roller 1 (Figure 1) can be effected wholly independently of that of the spindle at the other end, so that adjustments of sag, and resistance to sagging, and/or of lateral displacement of the spring roller, can be effected over a wide range, within the limits determined by the relative lengths of the screw-threads of the shanks 7 and bores 6 of the hubs 2.

Whilst the invention has been described herein as applied to an ordinary closed-coil spring roller, it is to be understood that it may be applied to spring rollers and idlers of other forms, such as, for example, open-coil spring rollers, or pre-stressed spring rollers as described in my co-pending patent application Serial No. 455,002, and to roller or idler systems embodying spring rollers set at right-angles to the line of travel of the conveyor belt or band, or to systems in which the rollers are set at an inclination to such line of travel as described in my co-pending patent application Serial No. 457,377, now abandoned.

I claim:

1. A spring roller or idler for a belt or band conveyor comprising a helically wound spring, two end hub elements disposed one at each end of the spring and to which the end convolutions of the latter are attached, a spindle carried by each of said end hub elements to project outwardly therefrom, bearing means for supporting said spindles so as to permit a limited amount of angular movement so that the spring roller is not only free to rotate but also to sag under its own weight and the weight of the belt or band and of the load carried thereby and means whereby each end hub element may be adjusted axially of its respective spindle thereby to vary the tension on the spring roller and to control the amount of sag.

2. A spring roller or idler for a belt or band conveyor comprising a helically wound spring, a pair of end hub elements disposed one at each end of the spring and to which the end convolutions of said spring are attached, each of said end hub elements having a threaded aperture therein coaxial with said spring, a spindle carried by each end hub element to project outwardly therefrom each spindle being threadedly engaged in the aperture in its respective end hub element whereby axial movement of the spindle relatively to said element may be effected, lock nut means associated with each spindle thereby to lock the same relatively to its respective end hub element in any selected position of adjustment and bearing means for supporting said spindles so as to permit a limited amount of angular movement so that the spring roller is not only free to rotate but also to sag under its own weight and the weight of the belt or band and of the load carried thereby, the arrangement being such that the tension on the spring roller may be adjusted to control the amount of sag by appropriate manipulation of the spindles and said lock nut means.

References Cited in the file of this patent

UNITED STATES PATENTS

| | | |
|---|---|---|
| 981,471 | Proal | Jan. 10, 1911 |
| 2,613,802 | Chapman | Oct. 14, 1952 |

FOREIGN PATENTS

| | | |
|---|---|---|
| 329,132 | Great Britain | May 15, 1930 |
| 496,987 | Great Britain | Dec. 9, 1938 |
| 497,868 | Belgium | Sept. 30, 1950 |
| 890,337 | France | Jan. 23, 1943 |